C. MORRIS.
Land-Marker.
No. 63,551. Patented Apr. 2 1867.
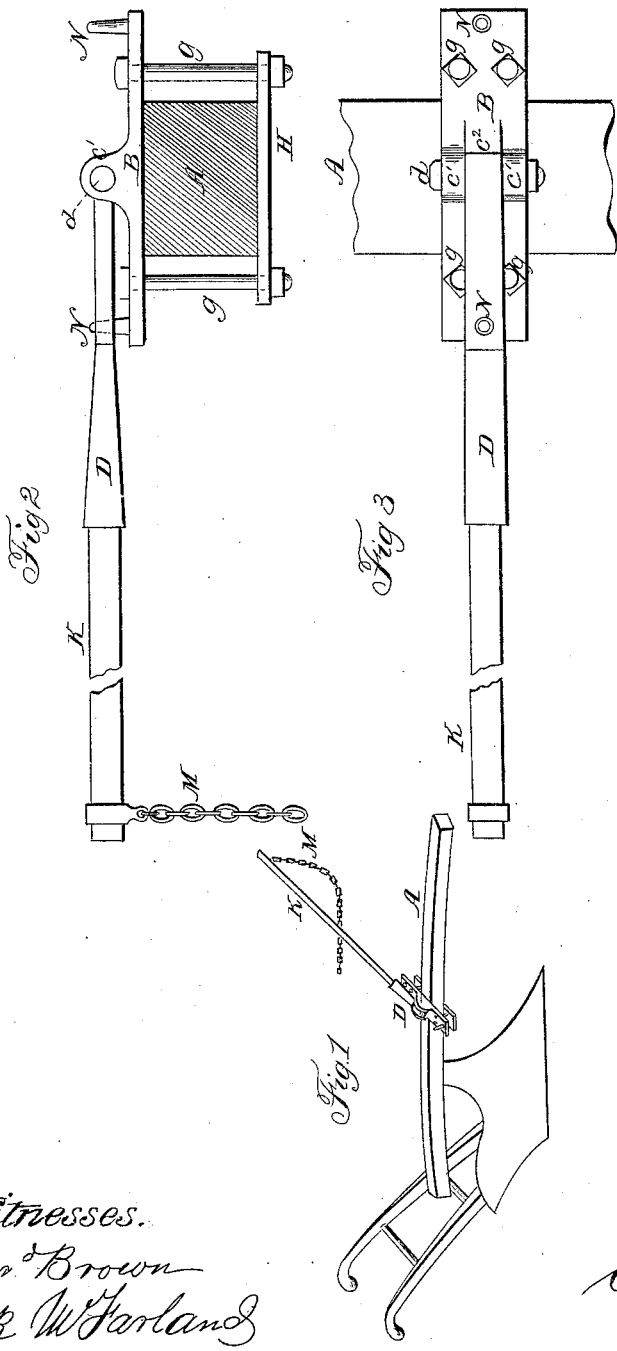
Witnesses.
Edw. Brown
Park McFarland
Inventor.
Charles Morris

United States Patent Office CHARLES MORRIS, OF STOCKTON TOWNSHIP, NEW JERSEY, ASSIGNOR TO HIMSELF, GEORGE RICHARDS, AND STANLEY C. HYLTON, OF PHILADELPHIA, PENNSYLVANIA.

Letters Patent No. 63,551, dated April 2, 1867.

IMPROVEMENT IN MARKING-ATTACHMENT FOR PLOUGHS.

The Schedule referred to in these Letters Patent and making part of the same.

TO ALL WHOM IT MAY CONCERN:

Be it known that I, CHARLES MORRIS, of Stockton township, Camden county, State of New Jersey, have invented a new and useful "Self-Marking Attachment for Ploughs;" and I do hereby declare the following is a full, clear, and exact description thereof, reference being had to the accompanying drawings, and to the letters of reference marked thereon.

My invention is used in planting, and consists of an attachment, securely fixed to the beam of a plough, for marking off or plotting out a line to serve as a guide for the next furrow of the plough. The common method is to use striking-out poles, which are stuck in the ground at one side of the field at a certain measured distance from the previous furrow. The ploughman loses much time in arranging these poles, and then often makes irregular work. By my invention this is obviated, and the distance certain to be regularly preserved.

Figure 1 shows my attachment fixed to the plough.

Figure 2 is a view of the attachment.

Figure 3 is a plan of the attachment.

A is the beam of the plough; B is an iron plate having two lugs, $C^1 C^1$, cast or forged on. This plate is cramped upon the beam A by the bolts $g$, which pass through the said plate and also the plate H on the opposite side of the beam. D is an iron socket, having an eye, $C^2$, at one end, which fits between the lugs $C^1 C^1$, and by the pin $d$ a joint is made, so that the said socket can be shifted from one side to the other, vibrating on the pin $d$ as a centre. Into the socket D is inserted and secured the wooden bar K, about five or six feet long, which carries at its outer end a chain, M, made sufficiently long to drag upon the ground. Steady-pins, N, are fast to the plate B, and pass through corresponding holes in the socket D, and take off the lateral strain from the joint $C^1 C^2$. The chain M may be fixed to a ferrule which slides upon the bar or pole K, and be secured in position at the proper distance by a wedge.

To use my invention, bolt it firmly to the plough beam, as shown in fig. 1, nearly over the colter, or a little behind it; let the bar K project on one side, and secure the chain M at the proper distance of say three or four feet, or whatever may be the distance apart of the rows to be planted. As the plough is driven across the field, the chain M marks a line as a guide for the next furrow; and on the return of the plough the arm K is reversed or thrown over to the opposite side, and the ploughing may be continued without intermission.

What I claim as my invention, and desire to secure by Letters Patent, is this:

Claim.

The combination and arrangement of the plough beam A with the cramp B H, the jointed and reversible bar D K, and the chain M, operating substantially as described.

CHARLES MORRIS.

Witnesses:
EDWARD BROWN,
PARK McFARLAND.